(12) United States Patent
Adcock

(10) Patent No.: US 7,909,306 B2
(45) Date of Patent: Mar. 22, 2011

(54) RATCHET STRAPPING DEVICE

(76) Inventor: Michael Rosso Adcock, Orange Beach, AL (US)

(*) Notice: Subject to any disclaimer, the term of this patent is extended or adjusted under 35 U.S.C. 154(b) by 0 days.

(21) Appl. No.: 12/562,857

(22) Filed: Sep. 18, 2009

(65) Prior Publication Data

US 2010/0071174 A1 Mar. 25, 2010

Related U.S. Application Data

(60) Provisional application No. 61/192,344, filed on Sep. 18, 2008.

(51) Int. Cl.
*B21F 9/00* (2006.01)
*B66F 3/00* (2006.01)
*A43C 11/00* (2006.01)

(52) U.S. Cl. ......... 254/218; 254/217; 254/223; 24/68 R; 24/69 ST

(58) Field of Classification Search .................. 254/213, 254/217, 218, 222, 223; 24/68 R, 70 ST, 24/69 ST
See application file for complete search history.

(56) References Cited

U.S. PATENT DOCUMENTS

| | | | | |
|---|---|---|---|---|
| 4,199,182 A * | 4/1980 | Sunesson | ................. | 24/68 CD |
| 5,271,606 A * | 12/1993 | Kamper | ..................... | 254/217 |
| 6,820,862 B2 * | 11/2004 | Terzagi | ...................... | 254/223 |
| 7,281,701 B1 * | 10/2007 | Huang et al. | ................. | 254/218 |
| 7,377,484 B1 * | 5/2008 | Williams | ..................... | 254/218 |
| 7,448,596 B1 * | 11/2008 | Chang | ........................ | 254/223 |
| 7,464,915 B2 * | 12/2008 | Liu et al. | ..................... | 254/217 |
| 7,510,168 B1 * | 3/2009 | Lin | ............................ | 254/218 |
| 7,651,072 B1 * | 1/2010 | Chang | ........................ | 254/218 |
| 7,758,023 B2 * | 7/2010 | Chang | ........................ | 254/218 |

* cited by examiner

*Primary Examiner* — Evan H Langdon
(74) *Attorney, Agent, or Firm* — Warner J. Delaune; Baker Donelson, et al

(57) ABSTRACT

An improved ratchet strapping device is provided, comprising a frame, an axle, and a handle pivotally installed on the axle. Ratchets are mounted on the axle and adjacent to the exterior of the frame. The frame includes a first detent on the outside of the frame which engages the ratchet. A release device is mounted on the handle, wherein the release device includes a second detent on the outside of the handle which engages the ratchets at another location. The frame includes a first cam having a radius greater than the ratchets and on which the second detent slides, and the handle includes a second cam having a radius greater than the ratchets and on which the first detent slides. Placement of the ratchet and detent components on the outside of the device permits spooling of substantially all of the strap for storage or unused portions of the strap during use.

14 Claims, 3 Drawing Sheets

RATCHET STRAPPING DEVICE

CROSS-REFERENCE TO RELATED APPLICATIONS

This nonprovisional patent application claims priority under 35 U.S.C. §119 to U.S. Provisional Application Ser. No. 61/192,344, filed on Sep. 18, 2008.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to strapping devices used to secure loads for transportation, and more particularly to ratchet strapping devices having the ability to spool unused portions of the strap.

2. Description of Related Art

In the transportation field, it is common to transport loads of equipment and supplies on vehicles where shifting of the load may occur due to normal vibration and motion during the travel. Consequently, such loads are often secured to the vehicle by one or more strapping devices. The most common strapping devices are comprised of a ratcheted locking member having a short hook-equipped strap permanently affixed to the locking member, and a long hook-equipped strap that is urged through the locking member.

The strapping device is typically employed by securing one end of the short strap at a first location on the vehicle, passing the long strap over or through the load, and then securing the long strap to a second location. The ratcheted locking member is then operated to pull the long strap through the locking member until the strapping device is tightened against the load. In almost all situations, there is an unused portion of the long strap that must be stored or otherwise secured so that it does not dangle and present a safety hazard, or left exposed to become damaged by surrounding equipment, oil, chemicals, or the elements.

The required collection of the unused long strap for its storage or keeping after its use is generally regarded by users as a time-wasting and irritating procedure. Ideally, the unused strap should be manually formed into a roll, but in practice, it is usually wrapped around the tightened portion of the strap or around other equipment. The necessity of securing the unused strap, unraveling it after use, and re-rolling it for storage has proven to be an inconvenient and time-consuming task, as well as an imperfect solution to the problem.

Few strapping devices have addressed the problem of how to secure the unused portion of the strap. Some have proposed reeling the unused portion on a separate reeling device or collector, as seen in U.S. Pat. No. 5,611,520 to Söderström, U.S. Pat. No. 6,102,371 to Wyers, U.S. Pat. No. 6,609,275 to Lin, U.S. Pat. No. 7,100,901 to Gleinser, U.S. Pat. No. 7,100,902 to Lu, and U.S. Pat. No. 7,296,326 to Madachy. Other have proposed spooling the unused strap around the main axle of the device, as seen in U.S. Pat. No. 7,350,767 to Huang.

However, none of the above devices provides a simple and effective solution, because they rely on existing devices and methods to tighten and lock the strap into place, e.g. using detents which are mounted and functional internal to the frame. Achieving the best and most compact solution would require removing critical elements to the outside or exterior of the strapping device, including the detents and ratchets. Placing such components on the outer surfaces of the strapping device would create a "free" area within the device within which the unused strap can be wound, both during actual use and for storage purposes. As will be seen, it is believed that the present invention achieves such objective.

SUMMARY OF THE INVENTION

An improved ratchet strapping device is provided, comprising a frame including two lateral members, the lateral members each including a first exterior surface; a first strap connected to the frame; an axle installed on the frame and supported by the lateral members of the frame; a second strap connected to the axle, wherein the axle includes a slot through which the second strap is directed; two ratchets rigidly mounted on the axle and adjacent to the first exterior surface of the frame; a first detent movably installed on the first exterior surface of the frame between an operative position in engagement with the ratchets and an idle position away from the ratchets; a handle including two support members pivotally installed on the axle, the support members each including a second exterior surface; a release device mounted on the second exterior surface of the handle, wherein the release device includes a second detent operable between an operative position in engagement with the ratchets and an idle position away from the ratchets; wherein each of the two lateral members of the frame includes a first cam having a radius greater than the ratchets and on which the second detent slides; and wherein each of the two support members of the handle includes a second cam having a radius greater than the ratchets and on which the first detent slides.

In a preferred embodiment, the first cam is positioned on the lateral members of the frame, and the second cam is positioned on the support members of the handle, such that when the second detent is caused to slidably engage the first cam, the first detent is caused to disengage the ratchet and slidably engage the second cam, placing the handle in a release position to permit unspooling of the second strap.

The first cam includes a notch engageable with the second detent of the release device when the handle is in a release position, allowing the second strap to be unspooled.

The first detent comprises a resiliently biased pawl mounted on each of the first exterior surfaces of the lateral members of the frame. In a more preferred embodiment, the pawl includes a rod slidably disposed within a closed channel on the first exterior surface of the lateral member, and wherein a compression spring resides between the channel and the pawl. Optionally, the pawl is slidably disposed within a slot formed in the lateral member.

The second detent comprises a resiliently biased pawl mounted on each of the second exterior surfaces of the support members of the handle. In a more preferred embodiment, the pawl includes a rod slidably disposed within a closed channel on the second exterior surface of the support member, and wherein a compression spring resides between the channel and the pawl. Optionally, the pawl is slidably disposed within a slot formed in the support member.

For convenience of operation, the rod of each pawl extends beyond the closed channel, and the rods may be connected by a grip adjacent to the handle.

For storage or carrying purposes, each of the lateral members of the frame includes a notch engageable with the second detent of the release device when the handle is in a locked position.

In a more preferred embodiment, the ratchets are positioned along the axle between the lateral members and the support members.

For ease of manufacturing and assembly, the axle includes end portions which protrude past the first exterior surfaces of the lateral members, and wherein the axle is retained between the lateral members by pins inserted through the end portions.

Based on the foregoing features, and because the operative mechanical elements of the device are positioned on the outside of the frame and handle, substantially all of the second strap is spoolable around the axle without reliance on a separate reeling device or other internal components.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
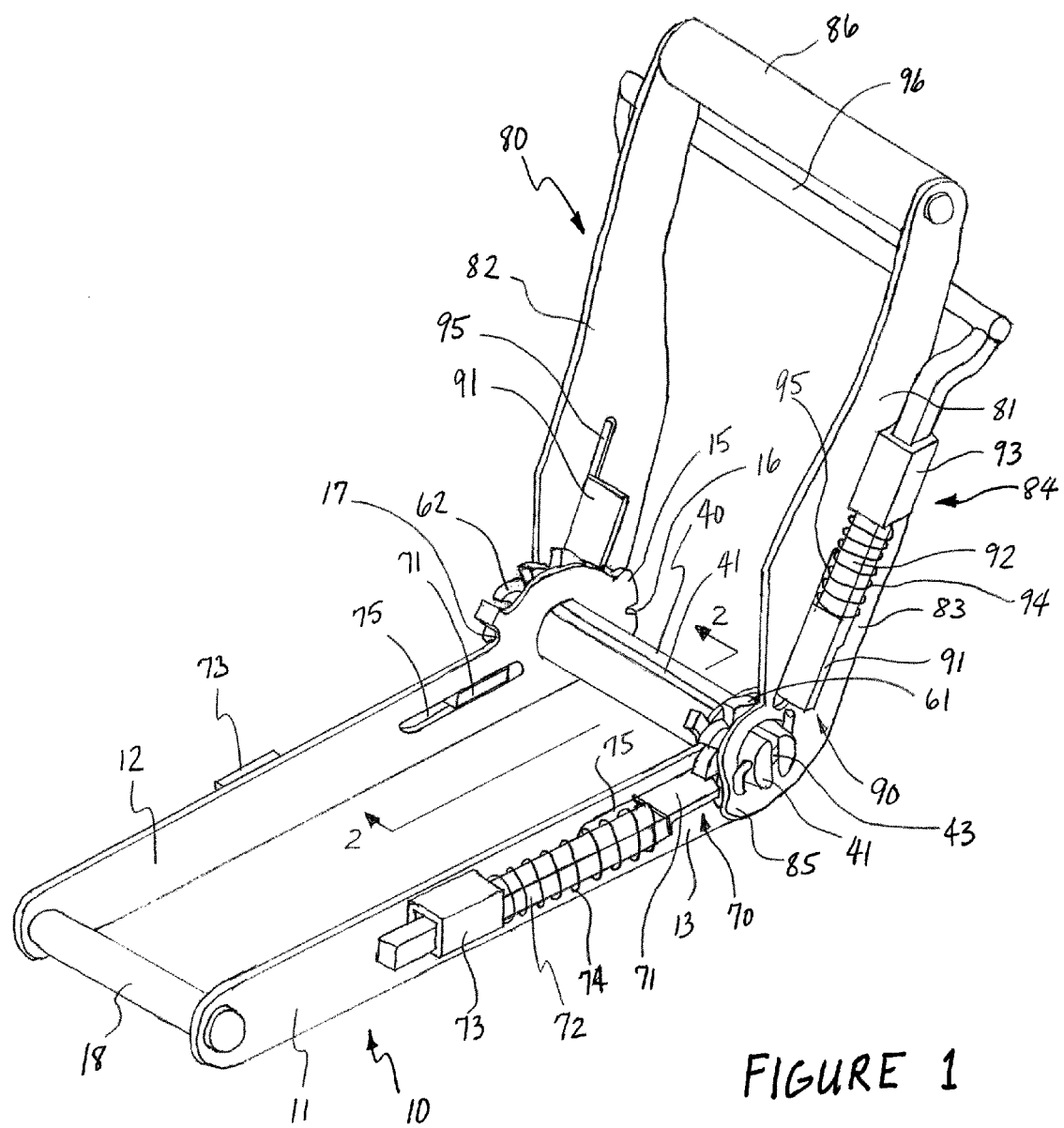
FIG. 1 shows an improved ratchet strapping device in accordance with one embodiment of the present invention.
Figure 2:
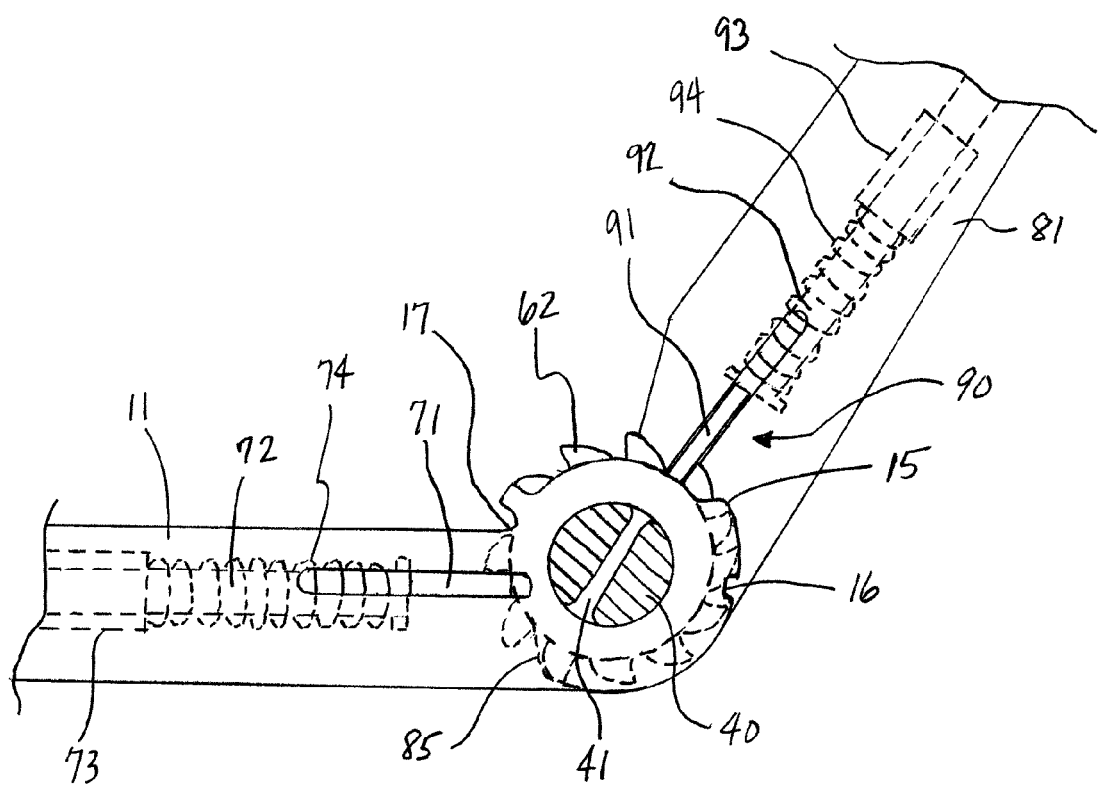
FIG. 2 shows a side view of the embodiment of FIG. 1 in an open position.
Figure 3:
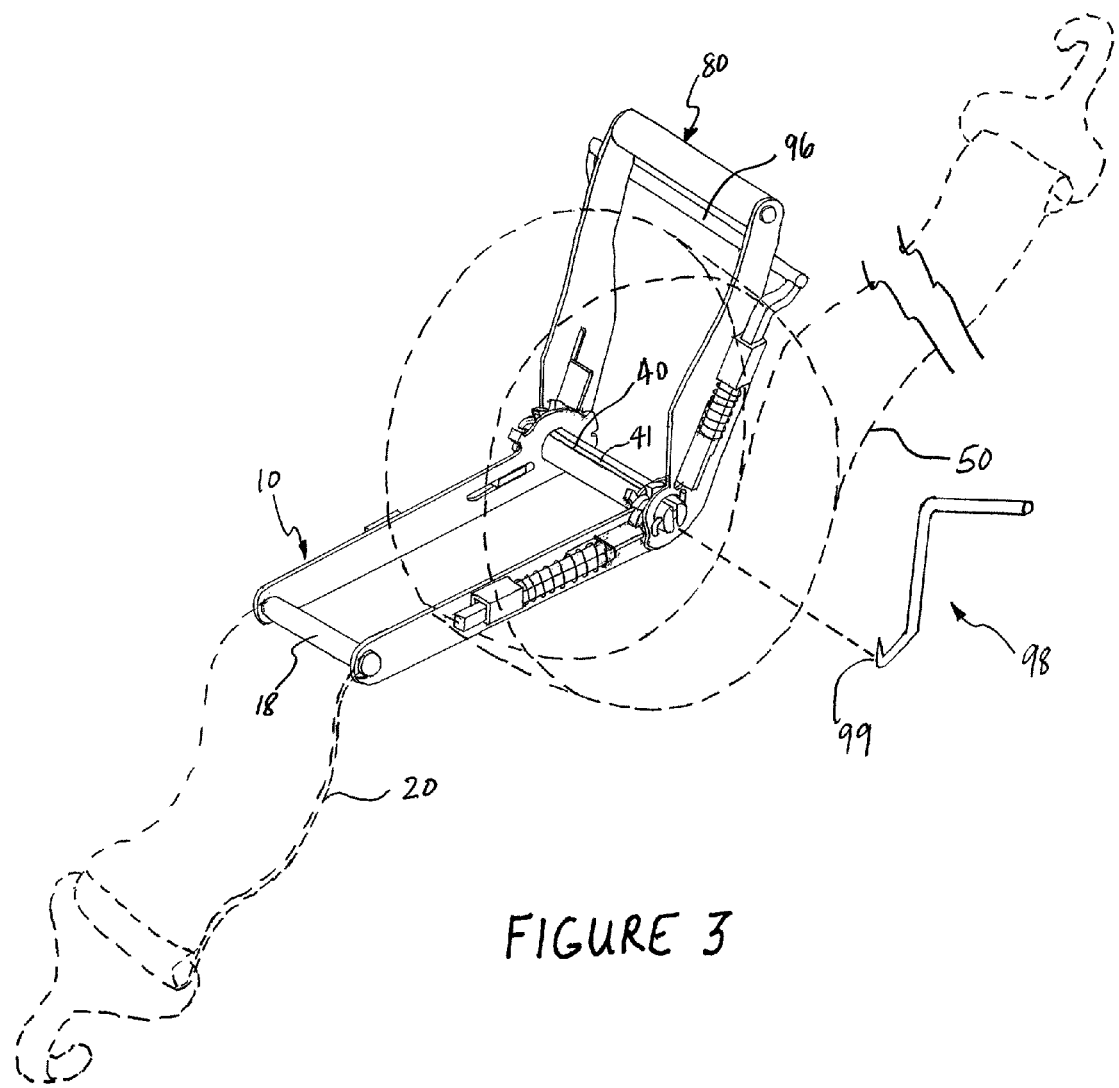
FIG. 3 shows a perspective view of the embodiment of FIG. 1 with suitable straps in a spooled configuration.

Referring to the drawings, and initially to FIGS. 1 and 3, an improved ratchet strapping device is shown in FIG. 1 with no straps for clarity, and in FIG. 3 with suitable straps shown in phantom lines to depict the device in a spooled and open configuration. In accordance with the present invention, the ratchet strapping device comprises a frame 10 including two lateral members 11, 12, connected by a cross bar 18, the lateral members 11, 12 each including a first exterior surface 13. As shown in FIG. 3, a first hook-ended strap 20 is connected to the cross bar 18 of the frame 10. An axle 40 is installed on the frame 10 and supported by the lateral members 11, 12 of the frame 10. As shown in FIG. 3, a second strap 50 is connected to the axle 40, wherein the axle 40 includes a slot 41 through which the second strap 50 is directed.

Two ratchets 61, 62 are rigidly mounted on the axle 40 and adjacent to the first exterior surface 13 of the frame 10. A first detent 70 is movably installed on the first exterior surface 13 of the frame 10 between an operative position in engagement with the ratchets 61, 62 and an idle position away from the ratchets 61,62. In this embodiment, the first detent 70 always operates passively, simply responding to the turn of the ratchets 61, 62 to keep the axle 40 from reversing direction while in operation.

The device further includes a handle 80 having two support members 81, 82 connected by a grip 86, and pivotally installed on the axle 40, the support members 81, 82 each including a second exterior surface 83. A release device 85 is mounted on the second exterior surface 83 of the handle 80, wherein the release device 84 includes a second detent 90 operable between an operative position in engagement with the ratchets 61, 62 and an idle position away from the ratchets 61, 62. In this embodiment, the second detent 90 is usually operated passively when moving the handle 80 toward a closed position, i.e. when one is spooling the strap 50 or tightening the device. However, it can also be operated by the grip 96 as further explained herein.

Each of the two lateral members 11, 12 of the frame 10 includes a first cam 15 having a radius greater than the ratchets 61, 62 and on which the second detent 90 slides. Likewise, each of the two support members 81, 82 of the handle 80 includes a second cam 85 having a radius greater than the ratchets 61, 62 and on which the first detent 70 slides.

As best illustrated in FIGS. 1 and 3, in a preferred embodiment, the first cam 15 is positioned on the lateral members 11, 12 of the frame 10, and the second cam 85 is positioned on the support members 81, 82 of the handle 80, such that when the second detent 90 is caused to slidably engage the first cam 15, the first detent 70 is caused to disengage the ratchets 61, 62 and slidably engage the second cam 85, placing the handle 80 in a release position to permit unspooling of the second strap 50. In other words, when both first cam 15 and second cam 85 are enagaged, the ratchets 61, 62 and axle 40 are free to rotate.

The first cam 15 further includes a notch 16 engageable with the second detent 90 of the release device 84 when the handle 80 is in a release position. Placing the second detent 90 in the notch 16 conveniently locks the device in a "free rotation" state, thus allowing the second strap 50 to be unspooled quickly, or spooled by a cranking handle 98 as explained below.

In a preferred embodiment, the first detent 70 comprises a resiliently biased pawl 71 mounted on each of the first exterior surfaces 13 of the lateral members 11, 12 of the frame 10. In a more preferred embodiment, each pawl 71 includes a rod 72 slidably disposed within a closed channel 73 on the first exterior surface 13 of each of the lateral members 11, 12, and wherein a compression spring 74 resides between the channel 73 and the pawl 71. The closed channel 73 is preferably welded to the lateral members 11, 12, but other methods of attachment may be suitable. Preferably, the compression spring 74 is installed such that the rod 72 resides within the compression spring 74, as depicted in FIG. 1. Optionally, the pawls 71 are slidably disposed within slots 75 formed in the lateral members 11, 12, such slots acting as a reinforcing guide as the pawls 71 are moved during operation. The rod 72 and closed channel 73 are preferably fabricated with a non-round cross section to resist undesirably bending when subjected to the normal forces during operation.

The second detent 90 comprises a resiliently biased pawl 91 mounted on each of the second exterior surfaces 83 of the support members 81, 82 of the handle 80. In a more preferred embodiment, each pawl 91 includes a rod 92 slidably disposed within a closed channel 93 on the second exterior surface 83 of each of the support members 81, 82, and wherein a compression spring 94 resides between the channel 93 and the pawl 91. The closed channel 93 is preferably welded to the support members 81, 82, but other methods of attachment may be suitable. Preferably, the compression spring 94 is installed such that the rod 92 resides within the compression spring 94, as depicted in FIG. 1. Optionally, the pawls 91 are slidably disposed within slots 95 formed in the support members 81, 82, such slots acting as a reinforcing guide as the pawls 91 are moved during operation. The rod 92 and closed channel 93 are preferably fabricated with a non-round cross section to resist undesirably bending when subjected to the normal forces during operation.

For convenience of operation, the rod 92 of each pawl 91 extends beyond the closed channel 93, and the rods 92 may be connected by a grip 96 adjacent to the handle 80. Thus, the release device 84 may be easily operated by grip 96 while the user holds on to the handle grip 86.

For storage or carrying purposes, each of the lateral members 11, 12 of the frame 10 includes a locking notch 17 engageable with the second detent 90 of the release device 84 when the handle 80 is in a locked position.

In a more preferred embodiment, the ratchets 61, 62 are positioned along the axle 40 between the lateral members 11, 12 and the support members 81, 82.

For ease of manufacturing and assembly, the axle 40 includes end portions 41, 42 which protrude past the first exterior surfaces 13 of the lateral members 11, 12, and wherein the axle 40 is retained between the lateral members 11, 12 by pins 43 inserted through the end portions 41, 42.

Optionally, as shown in FIG. 3, the device may further include a cranking handle 98 having a hooked end 99 which can be inserted within the slot 41 of the axle 40 to engage the pin 43. When engaged, and when the axle 40 is placed in a released position or "free rotation" state by first cam 15 and second cam 85, the cranking handle 98 can be conveniently used to quickly spool the strap 50 for storage.

Generally, it can be seen that the aforementioned design places most of the mechanical elements of the device on the outside of the frame 10 and handle 80, thus establishing a free and unrestricted volume for spooling of the strap 50. Moreover, the design requires no special components, such as coil springs or other internal parts, to perform all its intended functions.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. An improved ratchet strapping device, comprising:
a frame including two lateral members, the lateral members each including a first exterior surface;
a first strap connected to the frame;
an axle installed on the frame and supported by the lateral members of the frame;
a second strap connected to the axle, wherein the axle includes a slot through which the second strap is directed;
two ratchets rigidly mounted on the axle and adjacent to the first exterior surface of the frame;
a non-pivoting first detent slidably installed on the first exterior surface of the frame between an operative position in engagement with the ratchets and an idle position away from the ratchets;
a handle including two support members pivotally installed on the axle, the support members each including a second exterior surface;
a release device mounted on the second exterior surface of the handle, wherein the release device includes a non-pivoting second detent operable between an operative position in engagement with the ratchets and an idle position away from the ratchets;
wherein each of the two lateral members of the frame includes a first cam having a radius greater than the ratchets and on which the non-pivoting second detent slides; and
wherein each of the two support members of the handle includes a second cam having a radius greater than the ratchets and on which the non-pivoting first detent slides.

2. The device of claim 1, wherein the first cam is positioned on the lateral members of the frame, and the second cam is positioned on the support members of the handle, such that when the second detent is caused to slidably engage the first cam, the first detent is caused to disengage the ratchet and slidably engage the second cam, placing the handle in a release position to permit unspooling of the second strap.

3. The device of claim 2, wherein the first cam includes a notch engageable with the second detent of the release device when the handle is in a release position.

4. The device of claim 1, wherein the first detent comprises a resiliently biased pawl mounted on each of the first exterior surfaces of the lateral members of the frame.

5. The device of claim 4, wherein the pawl includes a rod slidably disposed within a closed channel on the first exterior surface of the lateral member, and wherein a compression spring resides between the channel and the pawl.

6. The device of claim 5, wherein the pawl is slidably disposed within a slot formed in the lateral member.

7. The device of claim 1, wherein the second detent comprises a resiliently biased pawl mounted on each of the second exterior surfaces of the support members of the handle.

8. The device of claim 7, wherein the pawl includes a rod slidably disposed within a closed channel on the second exterior surface of the support member, and wherein a compression spring resides between the channel and the pawl.

9. The device of claim 8, wherein the pawl is slidably disposed within a slot formed in the support member.

10. The device of claim 8, wherein the rod of each pawl extends beyond the closed channel, and wherein the rods are connected by a grip adjacent to the handle.

11. The device of claim 1, wherein each of the lateral members of the frame includes a notch engageable with the second detent of the release device when the handle is in a locked position.

12. The device of claim 1, wherein the ratchets are positioned along the axle between the lateral members and the support members.

13. The device of claim 1, wherein the axle includes end portions which protrude past the first exterior surfaces of the lateral members, and wherein the axle is retained between the lateral members by pins inserted through the end portions.

14. The device of claim 1, wherein the frame and the handle define a free and unrestricted volume for spooling of any excess of the second strap up to a location near the handle.

* * * * *